US010324558B2

(12) United States Patent
Li et al.

(10) Patent No.: US 10,324,558 B2
(45) Date of Patent: Jun. 18, 2019

(54) 3D MODULE, 3D DISPLAY DEVICE AND METHOD FOR DRIVING 3D MODULE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Changfeng Li, Beijing (CN); Xue Dong, Beijing (CN); Haisheng Wang, Beijing (CN); Yingming Liu, Beijing (CN); Shengji Yang, Beijing (CN); Xiaoliang Ding, Beijing (CN); Weijie Zhao, Beijing (CN); Hongjuan Liu, Beijing (CN); Wei Liu, Beijing (CN); Mubing Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 14/907,198

(22) PCT Filed: Aug. 10, 2015

(86) PCT No.: PCT/CN2015/086442
§ 371 (c)(1),
(2) Date: Jan. 22, 2016

(87) PCT Pub. No.: WO2016/123946
PCT Pub. Date: Aug. 11, 2016

(65) Prior Publication Data
US 2016/0378240 A1 Dec. 29, 2016

(30) Foreign Application Priority Data

Feb. 6, 2015 (CN) .......................... 2015 1 0064797

(51) Int. Cl.
G06F 3/041 (2006.01)
G06F 3/044 (2006.01)

(52) U.S. Cl.
CPC ............ *G06F 3/0416* (2013.01); *G06F 3/044* (2013.01); *G06F 3/0412* (2013.01); *G06F 2203/04111* (2013.01)

(58) Field of Classification Search
CPC ...................................................... G06F 3/044
See application file for complete search history.

(56) References Cited

U.S. PATENT DOCUMENTS 9,563,313 B2 * 2/2017 Bai ........................... G02F 1/13
9,851,825 B2 * 12/2017 Kim ...................... G06F 3/0412
(Continued)

FOREIGN PATENT DOCUMENTS

| CN | 101943975 A | 1/2011 |
| CN | 203241674 U | 10/2013 |

(Continued)

OTHER PUBLICATIONS

Second Office Action regarding Chinese Application No. 201510064797.6, dated Jun. 29, 2016. Translation provided by Dragon Intellectual Property Law Firm.
(Continued)

*Primary Examiner* — Amr A. Awad
*Assistant Examiner* — Stephen A Bray
(74) *Attorney, Agent, or Firm* — Harness, Dickey & Pierce, P.L.C.

(57) ABSTRACT

The present disclosure provides a 3D module, a 3D display device and a method for driving the 3D module. The 3D module includes: a first substrate and a second substrate arranged opposite to each other and a beam splitter between the first substrate and the second substrate. The first substrate is arranged at a light-exiting side of the 3D module.

(Continued)

The 3D module further includes: a touch module arranged between the first substrate and the beam splitter and including multiple self-capacitive electrodes arranged at an identical layer, and multiple touch signal lines configured to connect the self-capacitive electrodes to a touch detection circuit.

8 Claims, 6 Drawing Sheets

(56) References Cited

U.S. PATENT DOCUMENTS

| | | | | |
|---|---|---|---|---|
| 2011/0007030 A1* | 1/2011 | Mo | ................ | G06F 3/044 345/174 |
| 2011/0248938 A1 | 10/2011 | Kwak et al. | | |
| 2014/0009819 A1* | 1/2014 | Wu | ................ | G02F 1/13338 359/315 |
| 2014/0204290 A1* | 7/2014 | Chen | ................ | G06F 3/044 349/12 |
| 2015/0185902 A1* | 7/2015 | Liu | ................ | G06F 3/044 345/174 |
| 2015/0338952 A1* | 11/2015 | Shahparnia | ................ | G06F 3/0418 345/174 |

FOREIGN PATENT DOCUMENTS

| | | |
|---|---|---|
| CN | 104020891 A | 9/2014 |
| CN | 104216564 A | 12/2014 |
| CN | 104615323 A | 5/2015 |

OTHER PUBLICATIONS

First Office Action regarding Chinese application No. 201510064797.6, dated Jan. 6, 2016. Translation provided by Dragon Intellectual Property Law Firm.

Written Opinion of the International Searching Authority for international application No. PCT/CN2015/086442.

* cited by examiner

3D MODULE, 3D DISPLAY DEVICE AND METHOD FOR DRIVING 3D MODULE

CROSS-REFERENCE TO RELATED APPLICATIONS

This application is the U.S. national phase of PCT Application No. PCT/CN2015/086442 filed on Aug. 10, 2015, which claims a priority to the Chinese Patent Application No. 201510064797.6 filed on Feb. 6, 2015, the disclosures of which are incorporated in their entirety by reference herein.

TECHNICAL FIELD

The present disclosure relates to the field of display technology, in particular to a 3D module, a 3D display device and a method for driving the 3D module.

BACKGROUND

Along with the rapid development of the display technology, touch screen panels have been widely used in our daily life. Currently, depending on their structures, the touch panels may include Add-on Mode Touch Panels, On-Cell Touch Panels and In-Cell Touch Panels. For the In-Cell Touch Panel, touch electrodes are built in a liquid crystal display screen so as to reduce a thickness of the entire module as well as the production cost. As a result, the In-Cell Touch Panel has attached more and more attentions from various manufacturers.

Existing In-Cell capacitive touch panels include mutual-capacitive touch panels and self-capacitive touch panels. For the self-capacitive touch panel, a layer of self-capacitive electrodes is arranged in the touch panel and a driving signal is applied to the self-capacitive electrodes. When the touch panel is not touched by a finger, a capacitance of each self-capacitive electrode is of a constant value a. When the touch panel is being touched by the finger, a capacitance of the self-capacitive electrode is a sum of a capacitance of the finger and the original capacitance a. A touch position may be determined by detecting a change in the capacitance of each self-capacitive electrode.

Nowadays, 3D display technology begins to attract more and more attentions and becomes a development trend for a next-generation telecommunication and display technology. However, it is not well known how to apply In-Cell self-capacitive touch technology to a 3D display device.

SUMMARY

Technical Problems to Be Solved

An object of the present disclosure is to provide a 3D module, a 3D display device and a method for driving the 3D module, so as to apply the In-Cell self-capacitive touch technology to the 3D display device.

Technical Solutions

In one aspect, the present disclosure provides in some embodiments a 3D module, including a first substrate and a second substrate arranged opposite to each other, and a beam splitter arranged between the first substrate and the second substrate. The first substrate is arranged at a light-exiting side of the 3D module. The 3D module further includes a touch module arranged between the first substrate and the beam splitter and including multiple self-capacitive electrodes arranged at an identical layer, and multiple touch signal lines configured to connect each self-capacitive electrode to a touch detection circuit.

Alternatively, the multiple touch signal lines include: transparent lines located at a display region of the 3D module and peripheral lines located at a peripheral region of the 3D module, and the transparent lines are arranged at a layer and made of a material identical to the self-capacitive electrodes.

Alternatively, the multiple self-capacitive electrodes are arranged in a matrix form, the transparent lines are arranged vertically and arranged between the self-capacitive electrodes in two adjacent columns or arranged outside the self-capacitive electrodes, and for the multiple self-capacitive electrodes in an identical column, their widths in a row direction gradually decrease along an extension direction of each transparent line.

Alternatively, the multiple self-capacitive electrodes are arranged in a matrix form, the transparent lines are arranged laterally and arranged between the self-capacitive electrodes in two adjacent rows or arranged outside the self-capacitive electrodes, and for the multiple self-capacitive electrodes in an identical row, their widths in a column direction gradually decrease along an extension direction of each transparent line.

Alternatively, the multiple touch signal lines include transparent lines arranged at a display region of the 3D module and peripheral lines arranged at a peripheral region of the 3D module, the transparent lines are arranged at a layer different from the self-capacitive electrodes, an insulation layer is arranged between the transparent lines and the self-capacitive electrodes, via-holes are arranged in the insulation layer, and the transparent lines are connected to the self-capacitive electrodes through the via-holes.

Alternatively, the multiple self-capacitive electrodes are arranged in a matrix form and have an identical size, and the self-capacitive electrodes in two adjacent columns and/or rows are spaced apart from each other at an identical interval.

Alternatively, all the transparent lines are arranged parallel to each other at the display region and have an identical length and an identical width, and the number of the transparent lines at a coverage region of the self-capacitive electrodes in each column or row is the same.

Alternatively, the multiple self-capacitive electrodes are arranged in a matrix form, transparent lines for a portion of the multiple self-capacitive electrodes in an identical column or row extend along a first direction to a periphery of the display region, and transparent lines for the other portion of the self-capacitive electrodes extend along a second direction to a periphery of the display region, the first direction is substantially parallel and opposite to the second direction, the transparent lines extending to the peripheries of the display region are connected to the peripheral lines located at the peripheral region, and resistivity of the peripheral lines is smaller than that of the transparent lines.

Alternatively, the display region includes a long side and a short side, and the first direction and the second direction are substantially parallel to a direction in which the short side of the display region extends.

Alternatively, at least one perforation is arranged in each self-capacitive electrode.

Alternatively, the multiple touch signal lines include transparent lines arranged at a display region of the 3D module and peripheral lines arranged at a peripheral region of the 3D module, the transparent lines are arranged at a layer different from the self-capacitive electrodes, an insulation layer is arranged between the transparent lines and the self-capacitive electrodes, via-holes are arranged in the insulation layer, the transparent lines are connected to the self-capacitive electrodes through the via-holes, and at least a portion of the at least one perforation in each self-capacitive electrode is located within a region where orthographic projections of the transparent lines onto the self-capacitive electrode are located.

Alternatively, the beam splitter includes a first electrode, a second electrode arranged opposite to the first electrode, and a liquid crystal layer or an electrochromic material layer arranged between the first electrode and the second electrode. The first electrode is arranged at a side close to the self-capacitive electrodes, and the second electrode is arranged at a side away from the self-capacitive electrodes.

In another aspect, the present disclosure provides in some embodiments a 3D display device, including a display panel and the above-mentioned 3D module.

In yet another aspect, the present disclosure provides in some embodiments a method for driving a 3D module, including steps of: applying a first voltage to self-capacitive electrodes and a first electrode, and applying a second voltage different from the first voltage to a second electrode, so as to provide a voltage difference between the first electrode and the second electrode; and applying a third voltage to the self-capacitive electrodes and simultaneously applying a voltage having an amplitude and a frequency identical to the third voltage to the first electrode and the second electrode, when a touch made by a touch body has been detected, so as to enable the amplitude and frequency of the voltage applied to the first electrode to be identical to those of the voltage applied to the self-capacitive electrodes at the same time, and to maintain the voltage difference between the first electrode and the second electrode.

Beneficial Effects

According to the embodiments of the present disclosure, the touch module is built in the 3D module and arranged between the substrate at the light-exiting side and the beam splitter. As a result, it is able to achieve a touch function in a better manner.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
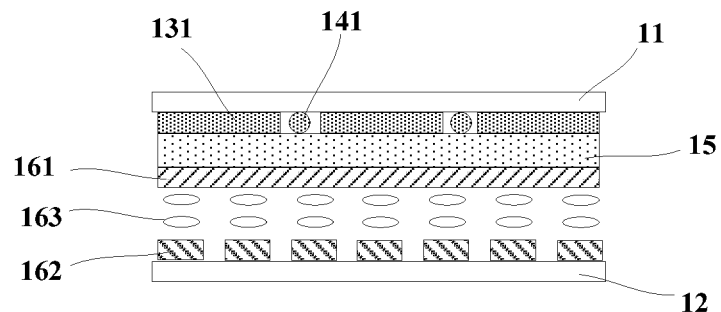
FIG. 1 is a sectional view showing a 3D module according to the first embodiment of the present disclosure.

The present disclosure will be described hereinafter in conjunction with the drawings and embodiments. The following embodiments are for illustrative purposes only, but shall not be used to limit the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a 3D module, which includes a first substrate and a second substrate arranged opposite to each other, and a beam splitter arranged between the first substrate and the second substrate. The first substrate is arranged at a light-exiting side of the 3D module. The 3D module further includes a touch module arranged between the first substrate and the beam splitter and including multiple self-capacitive electrodes arranged at an identical layer, and multiple touch signal lines configured to connect each self-capacitive electrode to a touch detection circuit.

The first substrate and the second substrate may be glass substrates or any other substrates each made of a transparent material.

The beam splitter may be of a 3D grating structure, or any other structures such as a splitting prism structure. The 3D module having the beam splitter may corporate with a display panel to perform 3D display. The display panel may be a liquid crystal display (LCD), an organic light-emitting diode (OLED) display panel, a plasma display panel or the like.

In the embodiments of the present disclosure, the multiple self-capacitive electrodes of the touch module are arranged at an identical layer and are independent from each other. These self-capacitive electrodes may be arranged in a matrix form or in any other forms, and they may be of a shape such as rectangle, triangle and diamond. Each self-capacitive electrode is made of a transparent conductive material such as indium tin oxide (no), and connected to one touch detection circuit via the touch signal line corresponding thereto. The touch detection circuit may determine a touch position by detecting a change in a signal on the self-capacitive electrode.

When the beam splitter is of the 3D grating structure, the 3D grating structure usually includes electrodes arranged opposite to each other. In the embodiments of the present disclosure, since the touch module is arranged between the beam splitter and the substrate arranged at the light-exiting side, the self-capacitive electrodes of the touch module may not be shielded by electrodes in the 3D grating structure, so it is able to achieve a touch function in a better manner.

In addition, when the beam splitter is of any other structures such as the splitting prism structure, the splitting prism structure includes no electrode by which the self-capacitive electrode is shielded. However, the touch module may be closer to a finger of a user (or a stylus) when the touch module is arranged between the beam splitter and the substrate arranged at the light-exiting side. In this way, it is also able to improve the touch sensitivity.

In the above embodiments, the touch module is built in the 3D module and the touch module is arranged between the substrate arranged at the light-exiting side and the beam splitter, so it is able to achieve the touch function in a better manner.

When the beam splitter is of the 3D grating structure, the beam splitter may include a first electrode and a second electrode arranged opposite to each other, and a liquid crystal layer or an electrochromic material layer arranged between the first electrode and the second electrode. The first electrode is arranged at a side close to the self-capacitive electrodes, and the second electrode is arranged at a side away from the self-capacitive electrodes.

Generally, the first electrode is a common electrode (Vcom) arranged at a whole layer, and the second electrodes are slit electrodes spaced apart from each other. During the 3D display, driving signals may be applied to the common electrode and/or the slit electrodes, so as to provide a voltage difference between the common electrode and the slit electrodes, thereby to drive liquid crystal molecules therebetween to rotate, or drive an electrochromic material therebetween to change its color.

In the following embodiments, the 3D grating structure is mainly taken as an example. Apparently, appropriate alterations may be made so as to be applicable to the beam splitter of any other structures such as the splitting prism structure.

In the embodiments of the present disclosure, the touch signal lines may include transparent lines located at a display region of the 3D module and peripheral lines located at a peripheral region of the 3D module. The transparent lines located at the display region may be made of a transparent oxide conductive material such as ITO. Since the transparent oxide conductive material such as ITO usually has a large resistance, the transparent lines may also be made of a transparent conductive nano-material with small resistivity, for example, nano-silver. The peripheral lines located at the peripheral region may be made of a material identical to the transparent lines at the display region. Specifically, these transparent lines may be formed by an identical layer of a transparent conductive film, so as to omit one mask process. In some other embodiments of the present disclosure, the peripheral lines may also be made of a material with low resistivity, e.g., a metal, so as to decrease the resistance.

There are various arrangement modes for the touch signal lines, and some of them will be described hereinafter.

In one embodiment of the present disclosure, the transparent lines are arranged at a layer and made of a material identical to the self-capacitive electrodes. That is, the transparent lines and the self-capacitive electrodes may be made of an identical layer of a transparent conductive film, so as to omit one mask process.

Figure 2:
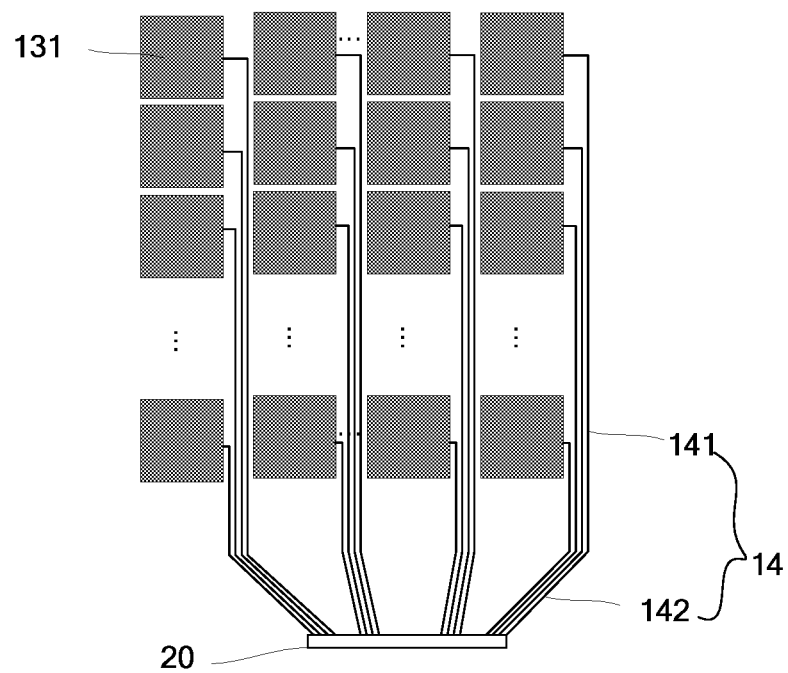
FIG. 2 is a top view of the 3D module according to the first embodiment of the present disclosure.

Reference may be made to FIG. 1 which is a sectional view of a 3D module according to the first embodiment of the present disclosure and FIG. 2 which is a top view of the 3D module according to the first embodiment of the present disclosure.

The 3D module in the first embodiment of the present disclosure includes: a first substrate 11, a second substrate 12, a touch module, multiple touch signal lines 14, an insulation layer 15 and a beam splitter. The first substrate 11 is arranged opposite to the second substrate 12, and the touch module and the beam splitter are located between the first substrate 11 and the second substrate 12. The first substrate 11 is arranged at a light-exiting side of the 3D module. The touch module is located between the first substrate 11 and the beam splitter and includes multiple self-capacitive electrodes 131 arranged at an identical layer. The multiple touch signal lines 14 are configured to connect the self-capacitive electrodes 131 to a touch detection circuit 20.

The beam splitter includes: a first electrode 161 and a second electrode 162 arranged opposite to each other, and a liquid crystal layer 163 between the first electrode 161 and the second electrode 162. The first electrode 161 is arranged at a side adjacent to the self-capacitive electrodes 131, while the second electrode 162 is arranged at a side away from the self-capacitive electrodes 131.

The touch signal lines 14 include: transparent lines 141 located at a display region of the 3D module and peripheral lines 142 located at a peripheral region of the 3D module. In the embodiment of the present disclosure, the transparent lines 141 are arranged at a layer and made of a material identical to the self-capacitive electrodes 131. That is, the transparent lines 141 and the self-capacitive electrodes 131 may be made of an identical layer of transparent conductive film (e.g., an ITO film), so as to omit one mask process.

In the embodiment of the present disclosure, the multiple self-capacitive electrodes 131 are arranged in a matrix. The transparent lines 141 are arranged vertically between the self-capacitive electrodes 131 in two adjacent columns or outside the self-capacitive electrodes 131.

In the embodiment of the present disclosure, the multiple self-capacitive electrodes 131 are of an identical size, and the self-capacitive electrodes 131 in two adjacent columns are spaced apart from each other at an identical interval. Alternatively, the self-capacitive electrodes 131 in two adjacent rows may also be spaced apart from each other at an identical interval, which is not particularly defined in the embodiment of the present disclosure.

As shown in FIG. 2, the number of the transparent lines 141 between the self-capacitive electrodes in two adjacent columns increases at a position close to the touch detection circuit 20. At this time, signal interference inevitably occurs between the transparent lines 141.

Figure 3:
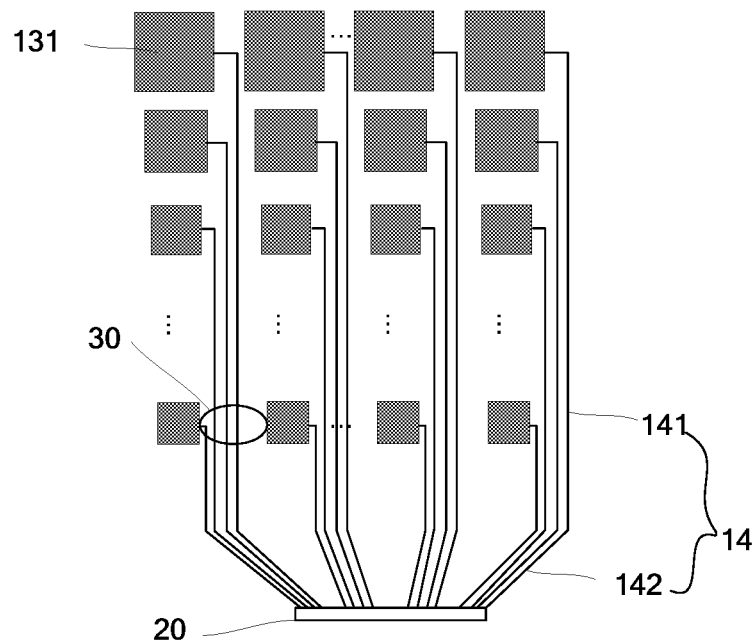
FIG. 3 is a top view of the 3D module according to the second embodiment of the present disclosure.

To solve this problem, in embodiment of the present disclosure, areas of the self-capacitive electrodes at the position close to the touch detection circuit 20 may be reduced, so as to ensure the distance between the transparent lines 141. Reference may be made to FIG. 3, which is a top view of the 3D module according to the second embodiment of the present disclosure. This embodiment differs from the embodiment shown in FIG. 2 in that, for the multiple self-capacitive electrodes in an identical column, their widths in a row direction gradually decrease along an extension direction of each transparent line, so as to ensure the interval between the transparent lines 141 thereby to reduce the signal interference therebetween.

In the above two embodiments, the transparent lines are arranged vertically. However, in some other embodiments of the present disclosure, the transparent lines may be arranged laterally between the self-capacitive electrodes in two adjacent rows or outside the self-capacitive electrodes. In addition, for the multiple self-capacitive electrodes in an identical row, their widths in a column direction gradually decrease along an extension direction of each transparent line, so as to ensure the interval between the transparent lines, thereby to reduce the signal interference between the transparent lines.

In the embodiment shown in FIG. 3, since the areas of the self-capacitive electrodes 131 at the position close to the touch detection circuit 20 are decreased, the distance between the self-capacitive electrodes 131 in two adjacent columns are increased, resulting in a touch blind zone. As shown in FIG. 3, a region surrounded by a circle is just a touch blind zone 30.

To avoid the touch blind zone, in another embodiment of the present disclosure, the transparent lines may be arranged at a layer different from the self-capacitive electrodes, and the transparent lines are connected to the self-capacitive electrodes through via-holes. With such structure, there is no need to pay attention to the interval between the transparent lines and thereby to reduce the areas of the self-capacitive electrodes.

Figure 4:
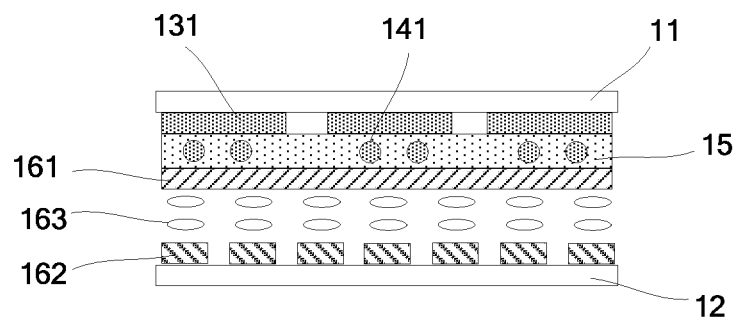
FIG. 4 is a sectional view showing the 3D module according to the third embodiment of the present disclosure.
Figure 5:
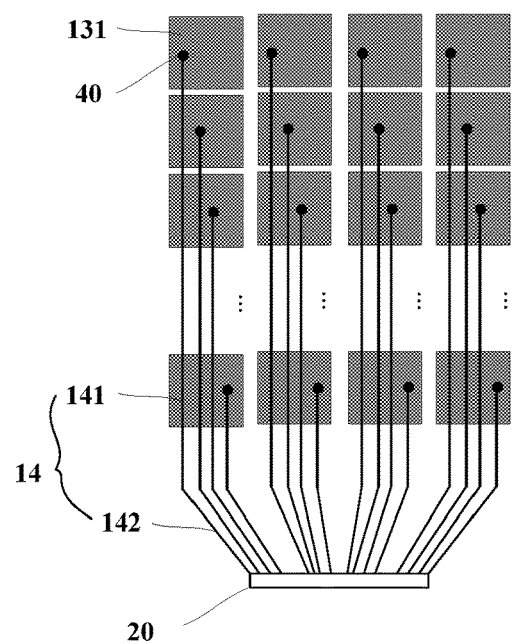
FIG. 5 is a top view of the 3D module according to the third embodiment of the present disclosure.

References may be made to FIG. 4 which is a sectional view of the 3D module according to the third embodiment of the present disclosure and FIG. 5 which is a top view of the 3D module according to the third embodiment.

In this embodiment, the 3D module includes: a first substrate 11, a second substrate 12, a touch module, multiple touch signal lines 14, an insulation layer 15 and a beam splitter. The first substrate 11 is arranged opposite to the second substrate 12, and the touch module and the beam splitter are located between the first substrate 11 and the second substrate 12. The first substrate 11 is arranged at a light-exiting side of the 3D module. The touch module is located between the first substrate 11 and the beam splitter and includes multiple self-capacitive electrodes 131 arranged at an identical layer. The multiple touch signal lines 14 are configured to connect the self-capacitive electrodes 131 to a touch detection circuit 20.

The insulation layer 15 includes an insulation layer between the self-capacitive electrodes 131 and transparent lines 141 and an insulation layer between the transparent lines 141 and the beam splitter.

The beam splitter includes: a first electrode 161 and a second electrode 162 arranged opposite to each other, and a liquid crystal layer 163 between the first electrode 161 and the second electrode 162. The first electrode 161 is arranged at a side adjacent to the self-capacitive electrodes 131, while the second electrode 162 is arranged at a side away from the self-capacitive electrodes 131.

The touch signal lines 14 include: transparent lines 141 located at a display region of the 3D module and peripheral lines 142 located at a peripheral region of the 3D module. In the embodiment of the present disclosure, the transparent lines 141 and the self-capacitive electrodes 131 are arranged at different layers, via-holes 40 are arranged in the insulation layer between the transparent lines 141 and the self-capacitive electrodes 131, and the transparent lines 141 are connected to the self-capacitive electrodes 131 through the via-holes 40.

In the embodiment of the present disclosure, the multiple self-capacitive electrodes 131 are arranged in a matrix. The multiple self-capacitive electrodes 131 are of an identical size, and the self-capacitive electrodes 131 in two adjacent columns are spaced apart from each other at an identical interval. Alternatively, the self-capacitive electrodes 131 in two adjacent rows may be spaced apart from each other at an identical interval, which is not particularly defined in the embodiment of the present disclosure.

In this embodiment of the present disclosure, the multiple self-capacitive electrodes 131 of the touch module have an identical size and are distributed uniformly. Since no lines are arranged at the layer where the self-capacitive electrodes 131 are located, it is able to reduce the interval between the self-capacitive electrodes 131 in two adjacent columns, thereby to prevent the occurrence of the touch blind zone.

In the above embodiment, all transparent lines 141 at the display region of the 3D module are arranged parallel to each other, but the multiple self-capacitive electrodes in an identical column correspond to the transparent lines 141 with different lengths. The transparent line 141 corresponding to the self-capacitive electrode farthest from the touch detection circuit 20 is the longest, and the transparent line 141 corresponding to the self-capacitive electrode closest to the touch detection circuit 20 is the shortest. In this way, at a coverage region of one of the self-capacitive electrode 131 in an identical column, the number of the transparent lines corresponding to the other self-capacitive electrodes 131 is different, and capacitances between each self-capacitive electrode 131 and the transparent lines corresponding to the other self-capacitive electrodes 131 at the coverage region are different too. At this time, the touch effect of the entire touch panel will be inevitably adversely affected.

Figure 6:
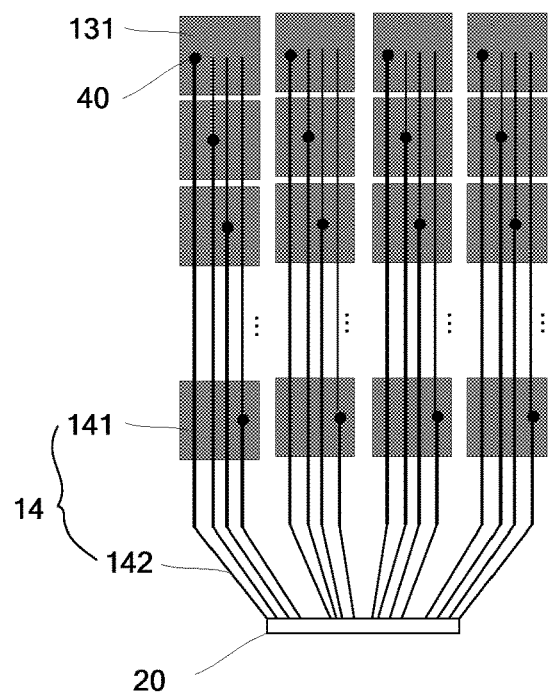
FIG. 6 is a top view of the 3D module according to the fourth embodiment of the present disclosure.

Reference may be made to FIG. 6, which is a top view of the 3D module according to the fourth embodiment of the present disclosure. This embodiment differs from that shown in FIG. 5 in that: all the transparent lines 141 at the display region of the 3D module are arranged parallel to each other, the transparent lines 141 are of an identical length and an identical width, and at the coverage region of one of the self-capacitive electrodes 131 in an identical column, the number of the transparent lines 141 are the same.

In this embodiment, overlapping areas between each self-capacitive electrode 131 and the transparent lines corresponding to the other self-capacitive electrodes 131 at the coverage region are the same or approximately the same, so as to ensure that the capacitances between each self-capacitive electrode 131 and the transparent lines corresponding to the other self-capacitive electrodes 131 at the coverage region are the same or approximately the same, thereby to improve the touch effect.

In the embodiment shown in FIG. 6, the lengths of the transparent lines 141 in the display region are relatively large. The transparent lines 141 are usually made of a transparent conductive material having large resistivity, e.g., ITO, so the resistance of each touch signal line is large, resulting in the occurrence of Resistor-Capacitor loading (RC loading).

To solve this problem, in the embodiments of the present disclosure, the transparent lines for a portion of the multiple self-capacitive electrodes in an identical column or row extend along a first direction to a periphery of the display region, and the transparent lines for the other portion of the self-capacitive electrodes extend along a second direction to a periphery of the display region, the first direction is substantially parallel and opposite to the second direction, and the transparent lines extending to the peripheries of the display region are connected to the peripheral lines located at the peripheral region. Resistivity of the peripheral lines is smaller than that of the transparent lines, that is, lengths of the transparent lines at the display region are set as small as possible, so as to reduce the resistance of the entire touch signal line.

Examples are given as follows.

Figure 7:
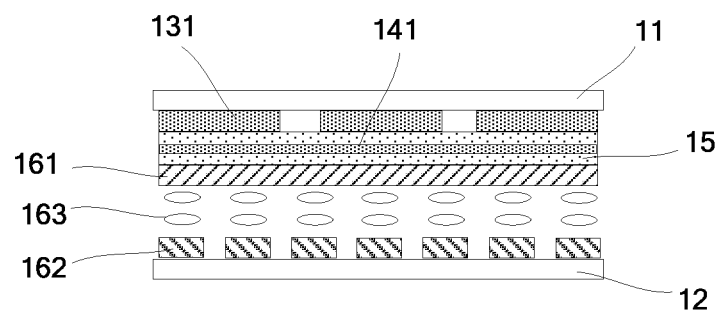
FIG. 7 is a sectional view of the 3D module according to the fifth embodiment of the present disclosure.
Figure 8:
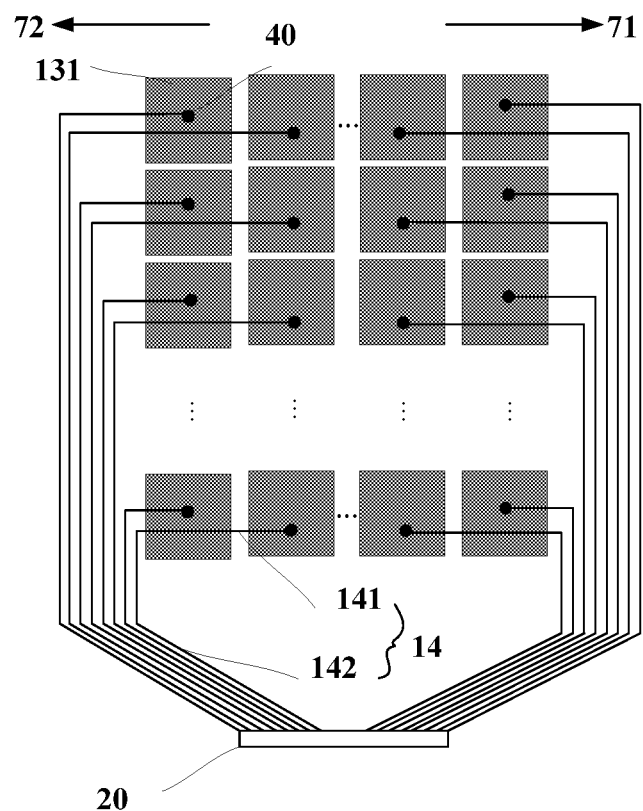
FIG. 8 is a top view of the 3D module according to the fifth embodiment of the present disclosure.

References may be made to FIG. 7 which is a sectional view of the 3D module according to the fifth embodiment of the present disclosure and FIG. 8 which is a top view of the 3D module according to the fifth embodiment of the present disclosure.

In this embodiment, the 3D module includes: a first substrate 11, a second substrate 12, a touch module, multiple touch signal lines 14, an insulation layer 15 and a beam splitter. The first substrate 11 is arranged opposite to the second substrate 12, and the touch module and the beam splitter are located between the first substrate 11 and the second substrate 12. The first substrate 11 is arranged at a light-exiting side of the 3D module. The touch module is located between the first substrate 11 and the beam splitter and includes multiple self-capacitive electrodes 131 arranged at an identical layer. The multiple touch signal lines 14 are configured to connect the self-capacitive electrodes 131 to a touch detection circuit 20.

The insulation layer 15 includes an insulation layer between the self-capacitive electrodes 131 and transparent lines 141 and an insulation layer between the transparent lines 141 and the beam splitter.

The beam splitter includes: a first electrode 161 and a second electrode 162 arranged opposite to each other, and a liquid crystal layer 163 between the first electrode 161 and the second electrode 162. The first electrode 161 is arranged at a side adjacent to the self-capacitive electrodes 131, while the second electrode 162 is arranged at a side away from the self-capacitive electrodes 131.

In the embodiment of the present disclosure, the multiple self-capacitive electrodes 131 are arranged in a matrix form. The multiple self-capacitive electrodes 131 are of an identical size, and the self-capacitive electrodes 131 in two adjacent columns are spaced apart from each other at an identical interval. Alternatively, the self-capacitive electrodes 131 in two adjacent rows may also be spaced apart from each other at an identical interval, which is not particularly defined in the embodiment of the present disclosure.

The touch signal lines 14 include: transparent lines 141 located at a display region of the 3D module and peripheral lines 142 located at a peripheral region of the 3D module. In the embodiment of the present disclosure, the transparent lines 141 and the self-capacitive electrodes 131 are arranged at different layers, via-holes 40 are arranged in the insulation layer between the transparent lines 141 and the self-capacitive electrodes 131, and the transparent lines 141 are connected to the self-capacitive electrodes 131 through the via-holes 40.

To reduce the resistances of the touch signal lines 14, in the embodiment of the present disclosure, the transparent lines for a portion of the self-capacitive electrodes in an identical row (a portion of the self-capacitive electrodes adjacent to a right side) each extend to a periphery of the display region along a first direction 71, and the transparent lines for the other portion of the self-capacitive electrodes (a portion of the self-capacitive electrodes adjacent to a left side) each extend to a periphery of the display region along a second direction 72. The first direction 71 and the second direction 72 are substantially parallel and opposite. The transparent lines 141 extending to the peripheries of the display region are connected to peripheral lines 142 located at the peripheral region. The resistivity of the peripheral lines 142 is smaller than that of the transparent lines 141. Alternatively, the peripheral lines 142 are made of a metallic material.

The number of the portion of the self-capacitive electrodes 131 adjacent to the right side may be identical to or different from the number of the portion of the self-capacitive electrodes 131 adjacent to the left side, which depends on practical need. The self-capacitive electrodes located at an identical side are adjacent to each other.

In the embodiment of the present disclosure, the transparent lines merely go across a half of a screen in the lateral direction. Taking a 5-inch FHD screen with a length of 110 mm and a width of 60 mm as an example, the transparent lines merely go across the display region with a width of 30 mm. As compared with the embodiment shown in FIG. 6 where the transparent lines should go across the display region with a length of 110 mm, the resistance of each transparent line in this embodiment is approximately reduced by three quarters. In addition, the resistances of the peripheral lines are very small, so in this way, it is able to remarkably reduce the RC loading of the entire touch signal line.

When the display region includes a long side and a short side, alternatively, the first direction 71 and the second direction 72 are parallel to a direction in which the short side of the display region extends, so as to further reduce the resistances of the touch signal lines.

In the above embodiment, a capacitance may be generated between each self-capacitive electrode and the touch signal line arranged at a different layer. In the 3D module of the 3D grating structure, a capacitance may also be generated between each self-capacitive electrode and the electrodes in the 3D grating structure. These capacitances may result in the RC loading and thereby the touch effect will be adversely affected.

To solve this problem, in the embodiment of the present disclosure, perforations may be arranged in each self-capacitive electrode, so as to reduce overlapping areas between each self-capacitive electrode and the touch signal lines as well as the electrodes in the 3D grating structure. In this way, it is able to reduce the capacitances between each self-capacitive electrode and the touch signal lines as well as the electrodes in the 3D grating structure, thereby to reduce the RC loading and improve the touch effect.

Figure 9:
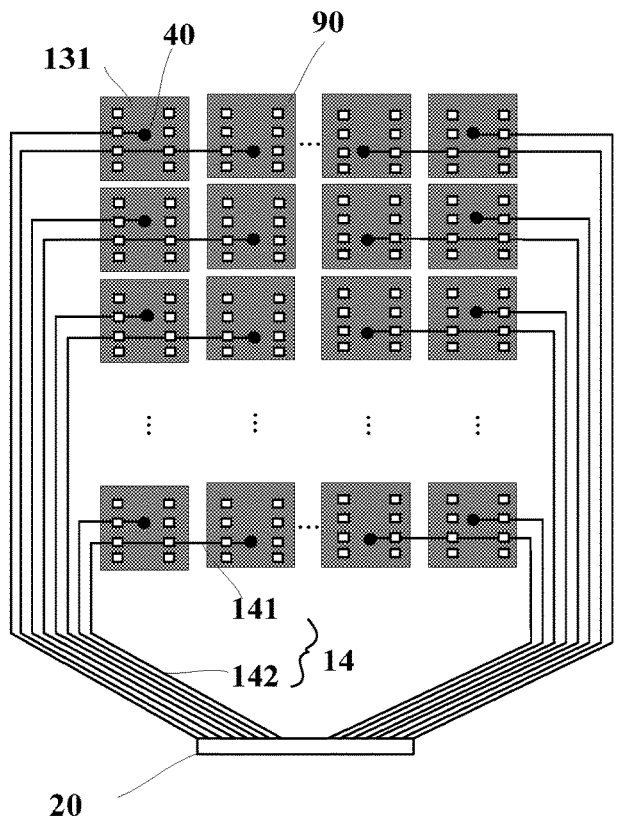
FIG. 9 is a top view of the 3D module according to the sixth embodiment of the present disclosure.

Reference may be made to FIG. 9, which is a top view of the 3D module according to the sixth embodiment of the present disclosure. This embodiment differs from that shown in FIG. 8 in that multiple perforations 90 are distributed in each self-capacitive electrode 131.

Alternatively, at least a portion of the perforations 90 in each self-capacitive electrode 131 are located at a region where orthographic projections of the transparent lines 141 onto the self-capacitive electrode 131 are located. In this way, it is able to further reduce the overlapping area between the self-capacitive electrode and the touch signal line, thereby to reduce the capacitance therebetween.

The present disclosure further provides in some embodiments a 3D display device, which includes a display panel and the above-mentioned 3D module arranged at a light-exiting side of the display panel.

In the 3D module of the 3D grating structure, capacitances may be generated between the self-capacitive electrodes and the first electrode arranged adjacent to the self-capacitive electrodes. To reduce the capacitances therebetween, in the embodiments of the present disclosure, a voltage with an amplitude and a frequency identical to the second voltage may be applied to the first electrode while applying a voltage to the self-capacitive electrodes, so as to ensure the amplitude and frequency of the voltage applied to the first electrode to be equal to those of the voltage applied to the self-capacitive electrodes at the same time, thereby to reduce or eliminate the capacitances therebetween and reduce the RC loading.

Figure 10:
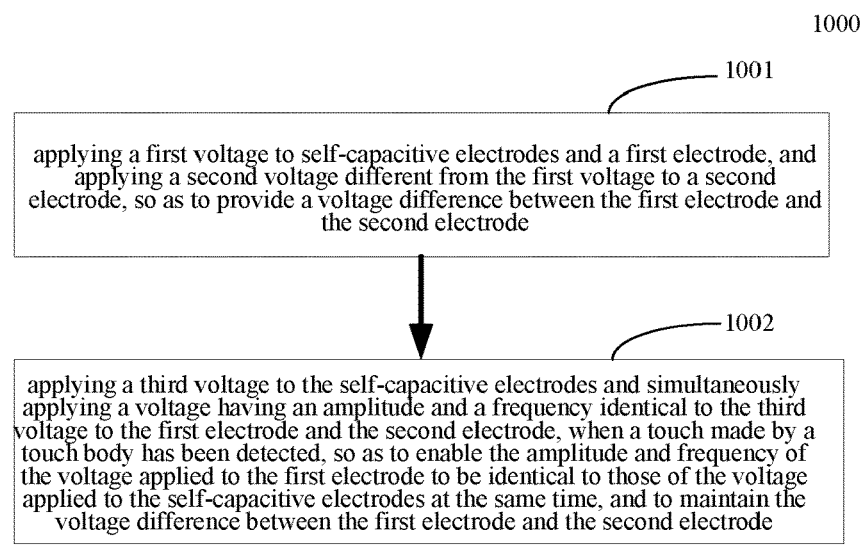
FIG. 10 is a flow chart of a method for driving the 3D module according to one embodiment of the present disclosure.

The present disclosure further provides in some embodiments a method for driving the above-mentioned 3D module. As shown in FIG. 10, the method 1000 includes Step S 1001 of applying a first voltage to self-capacitive electrodes and a first electrode, and applying a second voltage different from the first voltage to a second electrode, so as to provide a voltage difference between the first electrode and the second electrode, and Step S 1002 of applying a third voltage to the self-capacitive electrodes and simultaneously applying a voltage having an amplitude and a frequency identical to the third voltage to the first electrode and the second electrode, when a touch made by a touch body has been detected, so as to enable the amplitude and frequency of the voltage applied to the first electrode to be identical to those of the voltage applied to the self-capacitive electrodes at the same time, and to maintain the voltage difference between the first electrode and the second electrode.

The touch body, for example, is a finger of a user or a stylus or the like.

Figure 11:
FIG. 11 is a sequence diagram of the 3D module according to one embodiment of the present disclosure.

Reference may be made to FIG. 11, which is a sequence diagram of the 3D module according to one embodiment of the present disclosure. When no touch has been made, a voltage of bV is applied to the second electrode (a slit electrode), and no voltage, i.e., a voltage of 0V, is applied to the self-capacitive electrodes (TXs) and the first electrode (Vcom electrode). When a touch made by a touch body has been detected, voltages c with an identical amplitude and an identical frequency are simultaneously applied to the self-capacitive electrodes, the first electrode and the second electrode. When the voltages are not applied simultaneously, a large capacitance may be generated between each self-capacitive electrode applied with the voltage and the first electrode applied with no voltage, resulting in large RC loading. Furthermore, the voltage is applied to the second electrode at the same time, so as to ensure a constant voltage difference between the first electrode and the second electrode. In this way, it is able to cancel out the capacitances between the self-capacitive electrodes and the first electrode and ensure the constant voltage difference between the first electrode and the second electrode, thereby to form the grating and achieve the 3D effect.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A three-dimensional (3D) module, comprising:
a first substrate arranged at a light-exiting side of the 3D module;
a second substrate arranged opposite to the first substrate;
a beam splitter arranged between the first substrate and the second substrate;
a touch module arranged between the first substrate and the beam splitter and comprising a plurality of self-capacitive electrodes arranged at an identical layer; and
a plurality of touch signal lines configured to connect the self-capacitive electrodes to a touch detection circuit, wherein the plurality of touch signal lines comprises transparent lines located at a display region of the 3D module and peripheral lines located at a peripheral region of the 3D module, the transparent lines are arranged at a layer different from the self-capacitive electrodes, an insulation layer is arranged between the transparent lines and the self-capacitive electrodes, via-holes are arranged in the insulation layer, and the transparent lines are connected to the self-capacitive electrodes through the via-holes,
wherein the plurality of self-capacitive electrodes are arranged in a matrix form, the transparent lines for a portion of the plurality of self-capacitive electrodes in an identical column or row extend along a first direction to a periphery of the display region, and the transparent lines for the other portion of the self-capacitive electrodes extend along a second direction to a periphery of the display region, the first direction is substantially parallel and opposite to the second direction, each of the transparent lines extending in the first direction overlapping with only a portion of the self-capacitive electrodes among at least a row or a column of the self-capacitive electrodes and each of the transparent lines extending in the second direction overlapping with only a portion of the self-capacitive electrodes among at least one of the row or the column of self-capacitive electrodes, the transparent lines extending to the peripheries of the display region are connected to the peripheral lines located at the peripheral region; and
one or more perforations are arranged in each self-capacitive electrode, and an orthographic projection of each of the transparent lines onto one or more of the self-capacitive electrodes overlaps with respective at least one of the perforations.

2. The 3D module according to claim 1, wherein the plurality of self-capacitive electrodes have an identical size, and the self-capacitive electrodes in two adjacent columns and/or rows are spaced apart from each other at an identical interval.

3. The 3D module according to claim 1, wherein
at least a portion of the at least one perforation in each self-capacitive electrode are located within a region where orthographic projections of the transparent lines onto the self-capacitive electrode are located.

4. The 3D module according to claim 1, wherein the beam splitter comprises: a first electrode and a second electrode arranged opposite to each other, and a liquid crystal layer or an electrochromic material layer located between the first electrode and the second electrode; and
the first electrode is arranged at a side close to the self-capacitive electrodes, and the second electrode is arranged at a side away from the self-capacitive electrodes.

5. A three-dimensional (3D) display device, comprising a display panel and the 3D module according to claim 1.

6. A method for driving the 3D module according to claim 4, comprising:
applying a first voltage to the self-capacitive electrodes and the first electrode, and applying a second voltage different from the first voltage to the second electrode so as to provide a voltage difference between the first electrode and the second electrode; and
applying a third voltage to the self-capacitive electrodes and simultaneously applying a voltage having an amplitude and a frequency identical to the third voltage to the first electrode and the second electrode, when a touch made by a touch body has been detected so as to enable the amplitude and frequency of the voltage applied to the first electrode to be identical to those of the voltage applied to the self-capacitive electrodes at the same time, and to maintain the voltage difference between the first electrode and the second electrode.

7. The 3D module according to claim 1, wherein the display region comprises a long side and a short side, and the first direction and the second direction are substantially parallel to a direction in which the short side of the display region extends.

8. The 3D module according to claim 1, wherein resistivity of the peripheral lines is smaller than that of the transparent lines.

* * * * *